3,306,902
DIPHENYLOXAMIC ACID DERIVATIVES
Milton Wolf, 1208 Lotus Lane, West Chester, Pa. 19380, and Francis Greek, 73—34 Valley Ave., Philadelphia, Pa. 19128
No Drawing. Filed July 15, 1964, Ser. No. 382,945
9 Claims. (Cl. 260—268)

This invention is concerned with novel derivatives of diphenyloxamic acid.

The diphenyloxamic acid derivatives of this invention exhibit various therapeutic effects, as determined in warm blooded animals by standard test procedures. Specific embodiments of the present invention show central nervous system activity including tranquilizing activity; anti-Parkinsonian activity; antiviral activity; anticholingeric activity, and mydriatic activity.

The claimed compounds are represented by the following formula:

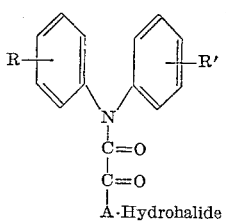

where A is selected from the group of:

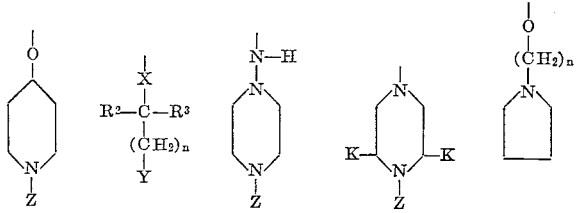

wherein X is oxygen; —N—H; or sulfur; Z is hydrogen, (lower) alkyl having up to 4 carbon atoms or phenyl; K is hydrogen or (lower) alkyl; R and R' may be the same or different and represent either H, alkyl having up to 4 carbons; phenyl(lower)alkyl, such as phenethyl; phenyl; halogen; alkoxy having up to 4 carbon atoms; alkylthio in which the alkyl moiety has up to 4 carbons; sulfamyl; alkylsulfamyl in which the alkyl moiety has up to 4 carbon atoms, carbalkoxy having up to 4 carbon atoms; acyl having up to 4 carbon atoms, anilino, cyano, nitro or halo (lower) alkyl. Y is amino or dialkylamino in which the alkyl moiety has up to 4 carbon atoms. $R^2$ and $R^3$ may be the same or different and can be: hydrogen, (lower) alkyl, lower alkoxy, phenyl, and $n$ is an integer ranging from 1 to 4.

The novel compounds made available by the present invention are prepared by the process illustrated by the following equation:

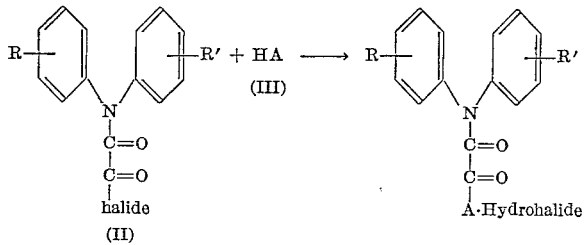

In the above formulas, R, R' and A have the meaning previously set forth.

In practising the process outlined above, a diphenyloxamidic acid chloride or bromide (II) prepared, for example, by the method of R. Stolle, J. prakt. Chem., 128, 1 (1930) is reacted with an aminoalcohol or a diamine represented by Formula III. This reaction is carried out generally by adding a solution of a diphenyloxamidic acid halide in an inert and preferably anhydrous solvent such as benzene, methylene chloride, ether or tetrahydrofuran to a solution of a compound of Formula III in a similar solvent. Substantially equimolar amounts of the reactants are employed in this reaction which proceeds exothermically with some vigor. After the initial reaction subsides, the reaction mixture is refluxed at its reflux temperature to complete the reaction (usually around 15 minutes). The compounds are usually recovered in the form of their hydrohalides such as their hydrochlorides. In this form, they are pharmaceutically acceptable. If desired, the compounds may be converted in known manner to their other acid addition salts with, for example, fumaric, maleic or sulfuric acid.

The following examples serve to illustrate but do not limit the invention:

Example 1.—1-diphenyloxamoyl-4-methylpiperazine hydrochloride

A solution of diphenyloxamidic acid chloride (2.60 g., 0.010 m.) in anhydrous ether (40 ml.) is added rapidly to a solution of 1-methylpiperazine (1.00 g., 0.010 m.) in anhydrous ether (25 ml.). There is an exothermic reaction, and a colorless solid separates. After the initial reaction subsides, the mixture is refluxed for 15 minutes, cooled and the colorless solid collected by filtration, washed with anhydrous ether (50 ml.), dried at 50° C./ house vac. The yield of colorless needles is 2.60 g. (72.2%), M.P. 237–240° C. (uncorr.). Recrystallization of the crude product from absolute ethanol gives colorless needles (2.10 g., 58.3%), M.P. 251–252° C. (uncorr.).

Analysis.—Calcd. for $C_{19}H_{22}ClN_3O_2$: C, 63.42; H, 6.16; N, 11.68; Cl, 9.85. Found: C, 63.31; H, 6.11; N, 11.24; Cl, 10.1.

Example 2.—Diphenyloxamic acid, 2-dimethylamino-1-methylethyl ester, hydrochloride Diphenyloxamidic acid chloride (2.60 g., 0.010 m.) in methylene chloride (15 ml.) is added in a single portion to a solution of 1-dimethylamino-2-propanol (1.03 g., 0.010 m.) in methylene chloride (15 ml.). After a mild exothermic reaction, the mixture is refluxed for 5 minutes then concentrated in vacuo. The residual gum crystallizes on trituration with a mixture of ether-ethylacetate. The product is collected by filtration, dried over $P_2O_5$ in a vacuum desiccator; yield, 3.05 g. (84.3%), M.P. 145–149° C. (uncorr.). Recrystallization of the crude product from acetone-hexane gives colorless prisms (2.75 g., 76.0%), M.P. 147–148° C. (uncorr.).

Analysis. — Calcd. for $C_{19}H_{23}ClN_2O_3$: C, 62.89; H, 6.37; N, 7.72. Found: C, 62.67; H, 6.58; N, 7.88.

Example 3.—N'-(2-diethylaminoethyl)-N,N-diphenyloxamide

Diphenyloxamidic acid chloride (3.85 g., 0.0144 m.) is added in a single portion to a solution of N,N-diethylethylenediamine (1.72 g., 0.0148 m.) in anhydrous benzene (30 ml.). A strong exothermic reaction occurs with the separation of an oil. After the initial reaction subsides, the mixture is refluxed for 15 minutes, cooled, and the solid product collected by filtration, washed with benzene, dried at 50° C./house vac. The crude product (4.50 g., 83.4%), M.P. 180–182° C. (uncorr.), is recrystallized from isopropyl alcohol with the aid of decolorizing carbon to obtain colorless prisms (3.70 g., 68.6%), M.P. 188–189° C. (uncorr.).

Analysis. — Calcd. for $C_{20}H_{26}ClN_3O_2$: C, 63.90; H, 6.97; N, 11.18. Found: C, 63.70; H, 7.04; N, 11.43.

*Example 4.—N'-(3-diethylaminopropyl)-N,N-diphenyloxamide hydrochloride*

A solution of N,N-diethyl-1,3-propanediamine (2.56 g., 0.0193 m.) in tetrahydrofuran (25 ml.) is added dropwise to a magnetically stirred solution of diphenyloxamidic acid chloride (5.0 g., 0.0193 m.) in tetrahydrofuran (25 ml.). After the addition is complete, the mixture is refluxed for one half hour, cooled, and the crude product collected by filtration, washed with ether, dried at 50° C./house vac. The yield of colorless solid is 6.43 g. (85.2%), M.P. 175.5–179.5° C. (uncorr.). Recrystallization of the crude product from isopropyl alcohol affords colorless prisms, 5.17 g. (68.4%), M.P. 191.0–191.5° C. (uncorr.).

Analysis. — Calcd. for $C_{21}H_{28}ClN_3O_2$: C, 64.68; H, 7.24; N, 10.78. Found: C, 64.90; H, 7.50; N, 10.58.

*Example 5.—Diphenyloxamic acid, 2-(1-pyrrolidinyl) ethyl ester hydrochloride*

The reaction of diphenyloxamidic acid chloride (5.00 g., 0.0193 m.) with 2-pyrrolidinoethanol (2.24 g., 0.0193 m.) in a manner similar to that of Example 4 yields the title compound (6.57 g., 90.8%), M.P. 115–118° C. (uncorr.). Recrystallization of the crude product from acetone-hexane yields colorless prisms (3.85 g., 53.2%), M.P. 135–136° C. (uncorr.).

Analysis. — Calcd. for $C_{20}H_{23}ClN_2O_3$: C, 64.09; H, 6.18; N, 7.47. Found: C, 64.12; H, 6.15; N, 7.39.

*Example 6.—N-(4-methyl-1-piperazinyl)-N',N'-diphenyloxamide hydrochloride*

The reaction of diphenyloxamidic acid chloride (5.00 g., 0.0193 m.) with 1-amino-4-methylpiperazine (2.24 g., 0.0193 m.) in a manner similar to that of Example 4 yields the title compound (6.70 g., 92.6%), M.P. 286.5–287.0° C. (uncorr.). Recrystallization of the crude product from methanol-ethanol gives colorless needles (5.28 g., 73.0%), M.P. 286.5–287.0° C. (uncorr.).

Analysis. — Calcd. for $C_{19}H_{23}ClN_4O_2$: C, 60.88; H, 6.18; N, 14.94. Found: C, 60.73; H, 6.16; N, 14.70.

*Example 7.—Diphenyloxamic acid, 3-diethylaminopropyl ester hydrochloride*

The reaction of diphenyloxamidic acid chloride (5.00 g., 0.0193 m.) with 3-diethylamino-1-propanol (2.52 g., 0.0193 m.) in a manner similar to that of Example 4 gives the title compound (6.27 g., 83.4%), M.P. 146.0–148.5° C. (uncorr.). Recrystallization of the crude product from isopropyl alcohol yields colorless prisms (4.88 g., 65.0%), M.P. 149.5–150.0° C. (uncorr.).

Analysis. — Calcd. for $C_{21}H_{27}ClN_2O_3$: C, 64.52; H, 6.96; N, 7.17. Found: C, 64.52; H, 6.79; N, 6.91.

*Example 8.—Diphenyloxamic acid, 3-dimethylaminopropyl ester hydrochloride*

The reaction of diphenyloxamidic acid chloride (5.00 g., 0.0193 m.) with 3-dimethylamino-1-propanol (1.99 g., 0.0193 m.) in a manner similar to that of Example 4 yields the title compound (6.02 g., 86.2%), M.P. 134–135° C. (uncorr.). Recrystallization of the crude product from tetrahydrofuran pentane gives colorless prisms (2.18 g., 31.2%), M.P. 135.0–136.5° C. (uncorr.).

Analysis.—Calcd. for $C_{19}H_{23}ClN_2O_3$: C, 62.89; H, 6.39; N, 7.72. Found: C, 62.77; H, 6.38; N, 7.75.

*Example 9.—Diphenyloxamic acid, 1-methyl-4-piperidinyl ester hydrochloride*

The reaction of diphenyloxamidic acid chloride (5.00 g., 0.0193 m.) with 4-hydroxy-1-methylpiperidine (2.20 g., 0.0193 m.) in a manner similar to that of Example 4 gives the title compound (7.20 g., 99.5%), M.P. 150.0–157.5° C. (uncorr.). Recrystallization of the crude product from isopropyl alcohol yields colorless prisms (4.61 g., 63.8%), M.P. 196.0–197.0° C. (uncorr.).

Analysis.—Calcd. for $C_{30}H_{22}ClN_2O_3$: C, 64.25; H, 5.93; N, 7.49. Found: C, 64.15; H, 6.23; N, 7.52.

*Example 10.—1-diphenyloxamyl-4-phenylpiperazine hydrochloride*

The reaction of diphenyloxamidic acid chloride (5.00 g., 0.0193 m.) with 1-phenylpiperazine (3.13 g., 0.0193 m.) in a manner similar to that of Example 4 affords the title compound (5.88 g., 72.4%), M.P. 195.0–198.0° C. (uncorr.). Recrystallization of the crude product from isopropyl alcohol gives colorless prisms (4.68 g., 57.5%), M.P. 197.0–201.0° C. (uncorr.).

Analysis.—Calcd. for $C_{24}H_{24}ClN_3O_2$: C, 68.33; H, 5.73; N, 9.96. Found: C, 68.62; H, 5.62; N, 10.21.

*Example 11.—Diphenylthioloxamic acid, 2-(diethylamino)ethyl ester hydrochloride*

The reaction of diphenyloxamidic acid chloride (5.00 g., 0.0193 m.) with 2-diethylaminoethanethiol (2.57 g., 0.0193 m.) in a manner similar to that of Example 4 yields the title compound (5.46 g., 72.2%), M.P. 176.0–179.5° C. (uncorr.). Recrystallization of the crude product from isopropyl alcohol gives colorless prisms (3.24 g., 42.8%), M.P. 189.0–190.0° C. (uncorr.).

Analysis.—Calcd. for $C_{20}H_{25}ClN_2O_2S$: C, 61.14; H, 6.41; N, 7.13. Found: C, 61.04; H, 6.38; N, 7.01.

*Example 12.—3,5-dimethyl-1-diphenyloxamoylpiperazine hydrochloride*

The reaction of diphenyloxamidic acid chloride (5.00 g., 0.0193 m.) with 2,6-dimethylpiperazine (2.21 g. 0.0193 m.) in a manner similar to that of Example 4 affords the title compound (6.50 g., 90.1%) M.P. 270° C. (uncorr.). Twofold recrystallization of the crude product from isopropyl alcohol gives colorless prisms (3.55 g., 49.3%), M.P. 276.0–279.0° C. (uncorr.).

Analysis.—Calcd. for $C_{20}H_{24}ClN_3O_2$: C, 64.25; H, 6.47; N, 11.24. Found: C, 64.38; H, 6.49; N, 10.88.

When applying the steps of the foregoing examples to the reactants listed below, the corresponding products hereinafter set forth are obtained:

| Reactants | Products |
| --- | --- |
| Diphenyloxamic acid bromide and piperazine. | 1-diphenyloxamoylpiperazine. |
| Diphenyloxamic acid chloride and 2-aminoethanethiol. | Diphenyloxamic acid, 2-aminoethylthioester. |
| (p-Ethylphenyl)phenyloxamic acid chloride and 1-methylpiperazine. | 1-(p-ethylphenyl)-phenyloxamoyl 4-methylpiperazine. |
| Bis (p-chlorophenyl)oxamic acid chloride and 1-methylpiperazine. | 1-[bis(p-chlorophenyl) oxamoyl]-4-methylpiperazine. |
| (o-Phenethylphenyl)phenyloxamic acid chloride and 1-ethyl piperazine. | 1-[(o-phenethylphenyl)-phenyloxamoyl]-4-ethyl piperazine. |
| (m-Butoxyphenyl)phenyloxamic acid chloride and 1-propyl piperazine. | 1-[(m-butoxyphenyl)phenyloxamoyl]-4-propyl piperazine. |
| (p-Sulfamylphenyl)phenyloxamic acid chloride and 1-methylpiperazine. | 1-[(p-sulfamylphenyl)-phenyloxamoyl]-4-methylpiperazine. |
| (p-Ethylsulfamylphenyl)phenyloxamic acid chloride and 1-methylpiperazine. | 1-[(p-ethylsulfamylphenyl)-phenyloxamoyl]-4-methyl piperazine. |
| (o-Carbethoxyphenyl)phenyloxamic acid chloride and 1-methylpiperazine. | 1-[(o-carbethoxyphenyl)-phenyl oxamoyl]-4-methylpiperazine. |
| (p-Acetylphenyl)phenyloxamic acid chloride and 1-methylpiperazine. | 1-[(p-acetylphenyl)phenyloxamoyl]-4-methylpiperazine. |
| (o-Anilinophenyl)phenyloxamic acid chloride and 1-methylpiperazine. | 1-[(o-anilinophenyl)-phenyloxamoyl]-4-methylpiperazine. |

| Reactants | Products |
|---|---|
| (o-Cyanophenyl)phenyloxamic acid chloride and 1-methylpiperazine. | 1-[(o-cyanophenyl)phenyloxamoyl]-4-methylpiperazine. |
| (m-Nitrophenyl)phenyloxamic acid chloride and 1-methylpiperazine. | 1-[(m-nitrophenyl)phenyloxamoyl]-4-methylpiperazine. |
| (p-Dichloromethylphenyl)phenyloxamic acid chloride and 1-methylpiperazine. | 1-[(p-dichloromethylphenyl)phenyloxamoyl]-4methylpiperazine. |
| Bis(p-chlorophenyl)oxamic acid chloride and 1-methylpiperazine. | 1-[bis(p-chlorophenyl)oxamoyl]-4-methylpiperazine. |
| (o-Phenethylphenyl)phenyloxamic acid bromide and 1-ethylpiperazine. | 1-[(o-phenethylphenyl)phenyloxamoyl]-4-ethylpiperazine. |
| (m-Butoxyphenyl)phenyloxamic acid chloride and 1-propylpiperazine. | 1-[(m-butoxyphenyl)phenyloxamoyl]-4-propylpiperazine. |
| (p-Sulfamylphenyl)phenyloxamic acid chloride and 1-methylpiperazine. | 1-[(p-sulfamylphenyl)phenyloxamoyl]-4-methylpiperazine. |
| (o-Carbobutoxyphenyl)phenyloxamic acid bromide and 1-methylpiperazine. | 1-[(o-carbobutoxyphenyl)phenyloxamoyl]-4-methylpiperazine. |
| 3-pyrrolidinopropanol and diphenyloxamidic acid chloride. | Diphenyloxamic acid, 3-(1-pyrrolidinyl)propyl ester. |
| 1-amino-4-butylpiperazine and diphenyloxamidic acid chloride. | N-(4-butyl-1-piperazinyl)-N',N'-diphenyloxamide. |
| 1,2,6-tributylpiperazine and diphenyloxamidic acid chloride. | 3,4,5-tributyl-1-diphenyloxamoyl piperazine. |
| 4-hydroxy-1-butylpiperidine and diphenyloxamidic acid chloride. | Diphenyloxamic acid, 1-butyl-4-piperidinyl ester. |
| 2-dibutylaminoethanethiol and diphenyloxamidic acid chloride. | Diphenylthioloxamic acid, 2-(dibutylamino)ethyl ester. |
| o-Phenethyl-diphenyloxamidic acid chloride and 2-dimethylamino ethanethiol. | 1-(o-phenethyl)-diphenylthioloxamic acid, 2-(dimethylamino) ethyl ester. |
| (m-Butoxy)-diphenyloxamidic acid chloride and 2-dipropylamino ethanethiol. | 1-(m-butoxy)-diphenylthioloxamic acid, 2-(dipropylamino)ethyl ester. |
| (o-Ethylmercapto)-diphenyl oxamidic acid chloride and 3-dimethylamino propanethiol. | 1-(o-ethylmercapto)-diphenyl thioloxamic acid, 3-(dimethylamino) propyl ester. |
| (p-Sulfamyl)-diphenyloxamidic acid chloride, and 3-pyrrolidinopropanol. | 1-(p-sulfamyl)-diphenyloxamic acid, 3-(1-pyrrolidinyl)propyl ester. |
| (p-Ethylsulfamyl)-diphenyloxamidic acid chloride and 2-pyrrolidino ethanol. | 1-(ethylsulfamyl)-diphenyloxamic acid, 2-(1-pyrrolidinyl) ethyl ester. |
| (o-Carbethoxy)-diphenyloxamidic acid chloride and 1-amino-4-propylpiperazine. | N-(4-propyl-1-piperazinyl)N',N'-diphenyl oxamide. |
| Bis(p-tolyl)oxamic acid and methyl piperazine. | 1-bis(p-tolyl)oxamoyl-4-methyl piperazine. |
| (m-Butyrylphenyl)phenyloxamic acid chloride and 1-methylpiperazine. | 1-(p-butyrylphenyl)phenyl oxamoyl-4-methylpiperazine. |
| 2,2-dimethylamino-1-phenylethanol and diphenyloxamidic acid chloride. | Diphenyloxamic acid, (2,2-dimethylamino-1-phenyl)ethyl ester. |
| 5,5-dimethylamino-1-pentanol and diphenyloxamic acid chloride. | Diphenyloxamic acid (5,5-dimethylamino)pentyl ester. |

The compounds of this invention can be administered with pharmaceutically acceptable inert carriers in a wide variety of oral or parenteral unit dosage forms containing 25, 100, 250 or 500 mg. of active ingredients for the symptomatic adjustment of the dosage to the individual patient, or in admixture with other active compounds.

The present invention also includes the process of bringing the compounds thereof into a form suitable for therapeutic administration by associating them with liquid or solid, pharmaceutically acceptable carriers.

What is claimed is:

1. A member selected from the group consisting of a compound of the formula:

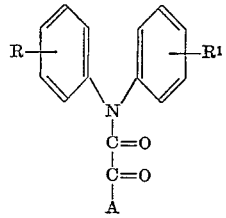

wherein A is selected from the group consisting of

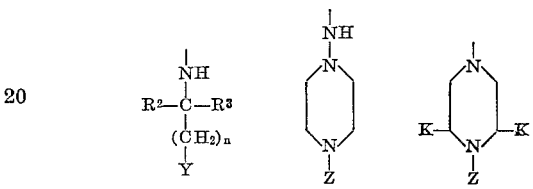

wherein Y is selected from the group consisting of amino and di(lower alkyl)amino; Z is selected from the group consisting of hydrogen, lower alkyl and phenyl; K is selected from the group consisting of hydrogen and lower alkyl; R and $R^1$ are each selected from the group consisting of hydrogen, lower alkyl, phenyl lower alkyl, halogen, lower alkoxy, lower alkyl thio, sulfamyl, lower alkylsulfamyl, lower carbalkoxy, lower alkanoyl, anilino, cyano, nitro and halo lower alkyl; $R^2$ and $R^3$ are each selected from the group consisting of hydrogen, lower alkyl, lower alkoxy and phenyl, and $n$ is an integer from one to four; and the pharmaceutically acceptable acid addition salts thereof.

2. 1-diphenyloxamoyl-4-(lower)alkyl piperazine.
3. N'-(2-di(lower)alkylaminoethyl)-N,N-diphenyloxamide.
4. 1-diphenyloxamoyl-1-methylpiperazine.
5. N'-(2-diethylaminoethyl)-N,N-diphenyloxamide.
6. N'-(3-diethylaminopropyl)-N,N-diphenyloxamide.
7. N-(4-methyl-1-piperazinyl)-N',N'-diphenyloxamide.
8. 1-diphenyloxamoyl-4-phenylpiperazine.
9. 3,5-dimethyl-1-diphenyloxamoyl piperazine.

No references cited.

ALEX MAZEL, *Primary Examiner.*

HENRY R. JILES, *Examiner.*

J. W. ADAMS, *Assistant Examiner.*

UNITED STATES PATENT OFFICE
CERTIFICATE OF CORRECTION

Patent No. 3,306,902　　　　　　　　　　　　　　February 28, 1967

Milton Wolf et al.

It is hereby certified that error appears in the above numbered patent requiring correction and that the said Letters Patent should read as corrected below.

In the heading to the printed specification, lines 3 to 5, for "Milton Wolf, 1208 Lotus Lane, West Chester, Pa. 19380, and Francis Greek, 73-34 Valley Ave., Philadelphia, Pa. 19128" read -- Milton Wolf, West Chester, and Francis Greek, Philadelphia, Pa., assignors to American Home Products Corporation, New York, N. Y., a corporation of Delaware --.

Signed and sealed this 28th day of November 1967.

(SEAL)
Attest:

Edward M. Fletcher, Jr.

Attesting Officer

EDWARD J. BRENNER

Commissioner of Patents